United States Patent
Cox et al.

(10) Patent No.: US 11,766,953 B2
(45) Date of Patent: Sep. 26, 2023

(54) ELECTRIFIED VEHICLE THERMAL MANAGEMENT SYSTEMS WITH BATTERY BYPASS LOOPS

(71) Applicant: FORD GLOBAL TECHNOLOGIES, LLC, Dearborn, MI (US)

(72) Inventors: David Cox, London (GB); Anthemios Petridis, Hertfordshire (GB); David Hesketh, Essex (GB); Nicholas Dashwood Crisp, Essex (GB); Jeffrey Dumont, Royal Oak, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 248 days.

(21) Appl. No.: 17/086,894

(22) Filed: Nov. 2, 2020

(65) Prior Publication Data
US 2022/0134905 A1   May 5, 2022

(51) Int. Cl.
| | | |
|---|---|---|
| *B60L 58/26* | (2019.01) | |
| *H01M 10/613* | (2014.01) | |
| *H01M 10/625* | (2014.01) | |
| *H01M 10/63* | (2014.01) | |
| *H01M 10/6565* | (2014.01) | |
| *H01M 10/48* | (2006.01) | |

(Continued)

(52) U.S. Cl.
CPC ............ *B60L 58/26* (2019.02); *B60L 50/60* (2019.02); *H01M 10/486* (2013.01); *H01M 10/613* (2015.04); *H01M 10/625* (2015.04); *H01M 10/63* (2015.04); *H01M 10/6565* (2015.04); *B60K 1/04* (2013.01); *B60K 6/28* (2013.01); *B60K 11/04* (2013.01); *B60K 11/06* (2013.01); *B60K 2001/005* (2013.01); *B60Y 2200/91* (2013.01); *B60Y 2200/92* (2013.01); *B60Y 2306/05* (2013.01); *H01M 2220/20* (2013.01)

(58) Field of Classification Search
CPC ............ H01M 10/486; H01M 10/613; H01M 10/625; H01M 10/63; H01M 10/6565; H01M 2220/20; B60K 11/06; B60K 2001/005; B60Y 2200/91; B60Y 2603/05; B60Y 2400/302; B60L 3/0046; B60L 2240/545; B60L 50/16; B60L 50/61; B60L 11/02; B60L 2001/003
See application file for complete search history.

(56) References Cited

U.S. PATENT DOCUMENTS

| | | |
|---|---|---|
| 10,220,722 B2 | 3/2019 | Lewis et al. |
| 10,714,799 B2 | 7/2020 | Yamamura |

(Continued)

FOREIGN PATENT DOCUMENTS

FR   3066140 A1 *  11/2018

OTHER PUBLICATIONS

Aubry et al., FR 3066140 A1; Espacenet machine translation, (Year: 2018).*

*Primary Examiner* — Adam A Arciero
(74) *Attorney, Agent, or Firm* — David B. Kelley; Carlson, Gaskey & Olds, P.C.

(57) ABSTRACT

This disclosure details thermal management systems for thermally managing electrified vehicle components. An exemplary thermal management system may be configured to direct a coolant through a battery bypass loop that bypasses a traction battery pack based on an amount of heat rejection into the coolant from a water charge air cooler.

19 Claims, 5 Drawing Sheets

(51) Int. Cl.
*B60L 50/60* (2019.01)
*B60K 1/00* (2006.01)
*B60K 1/04* (2019.01)
*B60K 11/04* (2006.01)
*B60K 11/06* (2006.01)
*B60K 6/28* (2007.10)

(56) References Cited

U.S. PATENT DOCUMENTS

2001/0039230 A1\* 11/2001 Severinsky ........... B60W 20/30
 180/65.23
2010/0009246 A1 1/2010 Maitre et al.
2018/0050605 A1\* 2/2018 Lewis ................... B60K 11/02

\* cited by examiner

ELECTRIFIED VEHICLE THERMAL MANAGEMENT SYSTEMS WITH BATTERY BYPASS LOOPS

TECHNICAL FIELD

This disclosure relates to electrified vehicle thermal management systems capable of maintaining various electrified vehicle components within desirable operating temperature ranges.

BACKGROUND

In general, electrified vehicles differ from conventional motor vehicles because they are selectively driven by one or more battery powered electric machines. Conventional motor vehicles, by contrast, rely exclusively on the internal combustion engine to propel the vehicle.

A high voltage traction battery pack typically powers the electric machines and other electrical loads of the electrified vehicle. The traction battery pack may include one or more groupings of interconnected battery cells. The battery cells generate heat during certain conditions, including during charging and discharging operations. Battery thermal management systems may be employed to manage the heat generated by the battery cells.

SUMMARY

A thermal management system according to an exemplary aspect of the present disclosure includes, among other things, a traction battery pack and a coolant subsystem configured to circulate a coolant through the traction battery pack. The coolant subsystem includes an air cooler loop and a battery bypass loop, a water charge air cooler positioned within the air cooler loop, a valve arranged to control a flow of the coolant to either the traction battery pack or the battery bypass loop, and a control unit configured to control a position of the valve based on an amount of heat rejection into the coolant from the water charge air cooler.

In a further non-limiting embodiment of the foregoing system, the traction battery pack includes an internal cooling circuit configured to receive the coolant from the valve.

In a further non-limiting embodiment of either of the systems, the coolant subsystem is configured to circulate the coolant through a power electronics module from either the battery pack or the battery bypass loop.

In a further non-limiting embodiment of any of the systems, the coolant subsystem includes a radiator and a pump.

In a further non-limiting embodiment of any of the systems, the coolant subsystem includes a T-joint configured to divide the coolant between a first portion that is directed to the water charger air cooler and a second portion that is directed to the valve.

In a further non-limiting embodiment of any of the systems, a first sensor monitors a temperature of the coolant, and a second sensor monitors a temperature of a battery cell of the traction battery pack.

In a further non-limiting embodiment of any of the systems, the control unit is configured to control the position of the valve based on feedback from the first sensor, the second sensor, or both.

In a further non-limiting embodiment of any of the systems, the water charge air cooler is part of an engine system that includes a turbocharger and an internal combustion engine.

In a further non-limiting embodiment of any of the systems, the control unit is configured to position the valve for directing the coolant through the battery bypass loop when a temperature of the coolant is greater than an upper coolant temperature threshold.

In a further non-limiting embodiment of any of the systems, the control unit is configured to position the valve for directing the coolant through the battery bypass loop when a temperature of the coolant is less than a lower coolant temperature threshold.

In a further non-limiting embodiment of any of the systems, the control unit is configured to position the valve for directing the coolant through the traction battery pack when a battery cell temperature of the traction battery pack is less than a lower battery cell full power temperature threshold.

In a further non-limiting embodiment of any of the systems, the water charge air cooler is fluidly connected to a radiator within the coolant subsystem.

A method according to another exemplary aspect of the present disclosure includes, among other things, allowing or preventing a flow of a coolant to a traction battery pack within an electrified vehicle thermal management system based on an amount of heat rejection from a water charge air cooler into the coolant.

In a further non-limiting embodiment of the foregoing method, the coolant is communicated to the traction battery pack when a battery cell temperature of the traction battery pack is less than a lower battery cell full power temperature threshold.

In a further non-limiting embodiment of either of the foregoing methods, the coolant is communicated to a battery bypass loop instead of the traction battery pack when a temperature of the coolant is greater than an upper coolant temperature threshold.

In a further non-limiting embodiment of any of the foregoing methods, the coolant is communicated to a battery bypass loop instead of the traction battery pack when a temperature of the coolant is less than a lower coolant temperature threshold.

In a further non-limiting embodiment of any of the foregoing methods, the method includes communicating the coolant through a battery bypass loop and then to a power electronics module when the flow of the coolant is prevented to the traction battery pack.

In a further non-limiting embodiment of any of the foregoing methods, the water charge air cooler is fluidly connected to a radiator within a coolant subsystem of the thermal management system.

In a further non-limiting embodiment of any of the foregoing methods, the method includes monitoring a temperature of the coolant with a first sensor, and monitoring a temperature of a battery cell of the traction battery pack with a second sensor.

In a further non-limiting embodiment of any of the foregoing methods, the method includes entering a limited operating strategy of the electrified vehicle when the coolant is prevented from flowing to the traction battery pack.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details thermal management systems for thermally managing electrified vehicle components. An exemplary thermal management system may be configured to direct a coolant through a battery bypass loop that bypasses a traction battery pack based on an amount of heat rejection into the coolant from a water charge air cooler. These and other features are discussed in greater detail in the following paragraphs of this detailed description.

Figure 1:
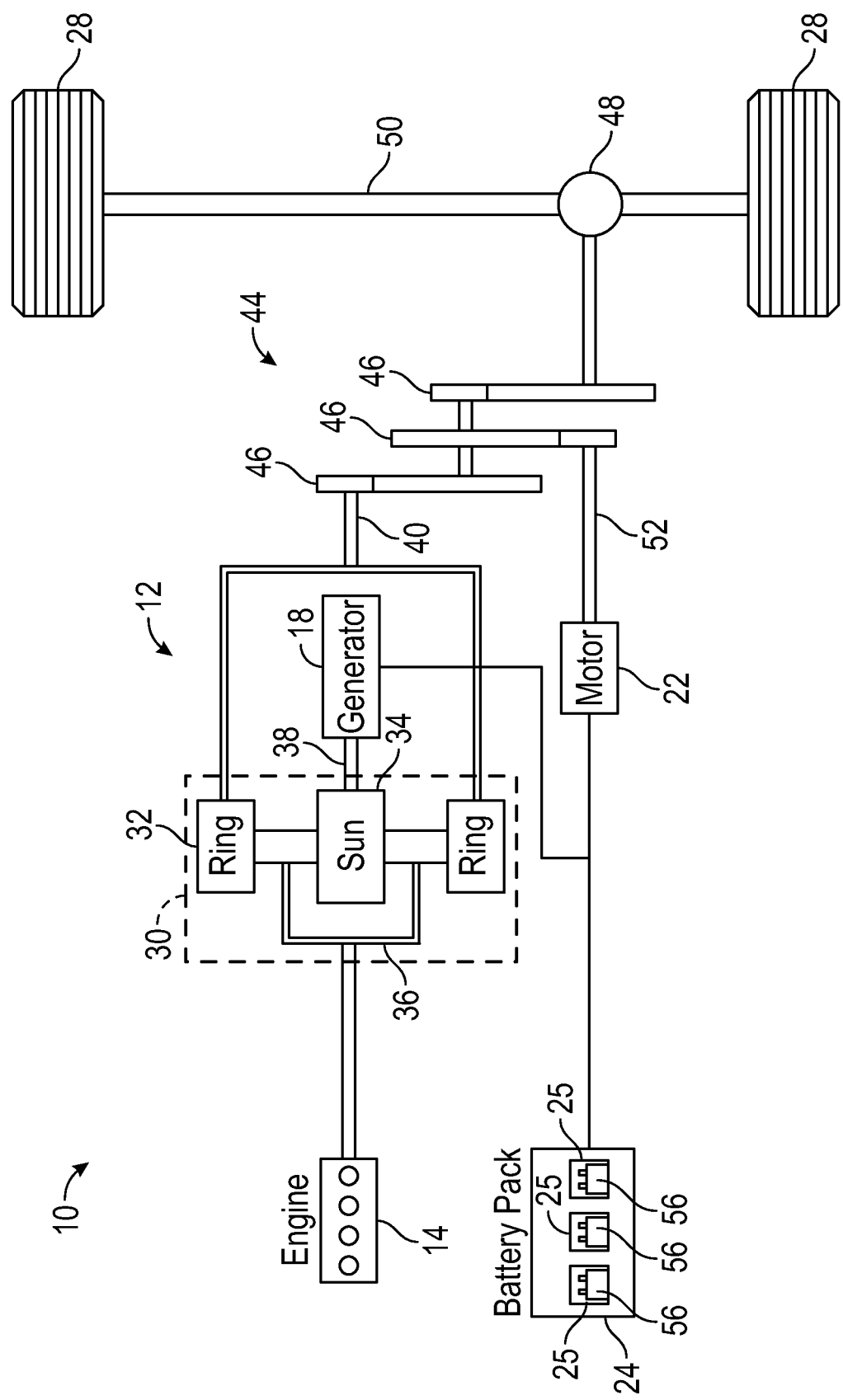
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEVs), battery electric vehicles (BEVs), fuel cell vehicles, etc.

In an embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids, or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery arrays 25 (i.e., battery assemblies or groupings of battery cells 56) capable of outputting electrical power to operate the motor 22, the generator 18, and/or other electrical loads of the electrified vehicle 12 for providing power to propel the wheels 28. Other types of energy storage devices and/or output devices could also be used to electrically power the electrified vehicle 12.

The battery cells 56 of the battery pack 24 are sensitive to temperature. The battery cells 56 must typically be maintained within a relatively narrow temperature range (e.g., between 20° C. and 60° C.) in order for the battery pack 24 to meet expected power demand and/or charge acceptance performance. This disclosure therefore details systems and methods for actively managing the temperature of the battery pack 24 and other electric drive components in order to improve the performance of the battery pack.

Figure 2:
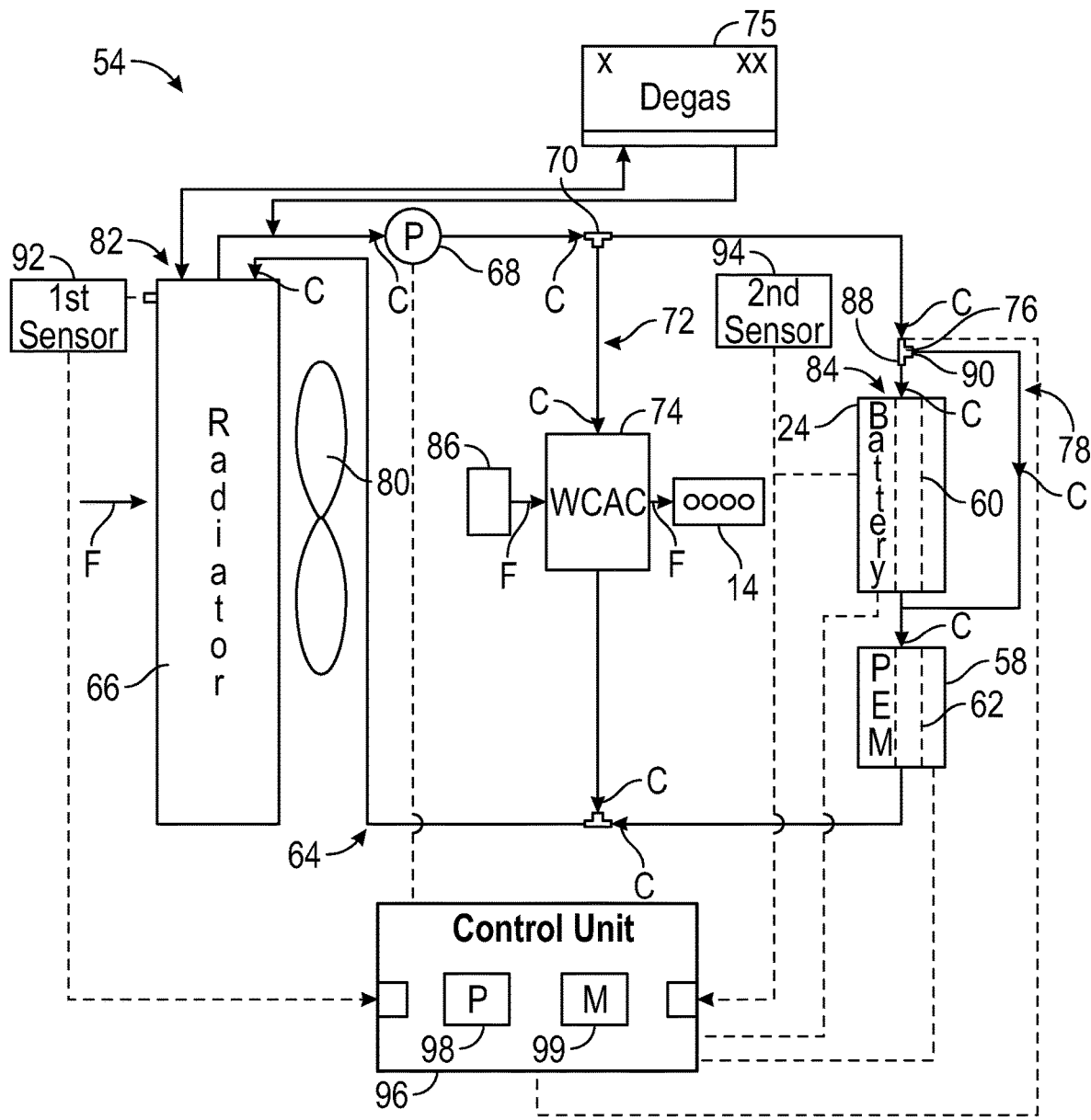
FIG. 2 schematically illustrates a thermal management system for thermally managing components of an electrified vehicle.

FIG. 2 schematically illustrates a thermal management system 54 that can be incorporated into an electrified vehicle, such as the electrified vehicle 12 of FIG. 1. The battery thermal management system 54 may be controlled to manage the thermal loads generated by various vehicle components, such as the battery pack 24 and a power electronics module 58 of the electrified vehicle 12, for example. Although shown schematically, the power electronics module 58 could include one or more of a DC-DC converter, a motor controller (which may be referred to as an inverter system controller or ISC), a belt integrated starter generator (BISG), etc.

In an embodiment, the thermal management system 54 selectively communicates a coolant C through the battery pack 24 to cool the battery pack 24 by removing heat from the battery cells 56, and communicates the coolant C through the power electronics module 58 for removing heat from the components of the power electronics module 58. The coolant C may be circulated through an internal cooling circuit 60 of the battery pack 24 and through an internal cooling circuit 62 for removing heat (or adding heat in some instances) from these components in a convective heat transfer process, for example. The internal cooling circuits 60, 62 may be established by integrated heat exchangers of the battery pack 24 and the electric machine power electronics module 58.

The thermal management system 54 includes a coolant subsystem 64 for circulating the coolant C. The coolant subsystem 64 may circulate the coolant C, such as water mixed with ethylene glycol or any other suitable coolant, to thermally manage various components of the electrified vehicle 12. The coolant subsystem 64 may include at least a radiator 66, a pump 68, a T-joint 70, an air cooler loop 72 that includes a water charge air cooler (WCAC) 74, a valve 76, and a battery bypass loop 78. Although only schematically shown, the various components of the coolant subsystem 64 can be fluidly interconnected by conduits or passages such as tubes, hoses, pipes, etc.

During operation of the coolant subsystem 64, thermal energy may be transferred from the coolant C to ambient air outside the vehicle within the radiator 66. A fan 80 may be positioned adjacent to the radiator 66 and is configured to draw an airflow F through the radiator 66 for undergoing convective heat transfer with the coolant C. For example, the airflow F exchanges heat with the coolant C as the two fluids flow across/through the radiator 66. The cooled coolant C may then be returned to the battery pack 24 and/or the power electronics module 58 in a closed loop.

A portion of the coolant C exiting the radiator 66 may be communicated to a degas overblow bottle 75. The degas overflow bottle 75 separates entrained air and gasses from the coolant C. In an embodiment, the coolant C exiting the degas overflow bottle 75 is recombined with another portion of the coolant C exiting from an outlet 82 of the radiator 66.

The pump 68 may circulate the coolant C through the coolant subsystem 64. In an embodiment, the pump 68 is located between the outlet 82 of the radiator 66 and an inlet 84 of the battery pack 24. However, the pump 68 could be located elsewhere within the coolant subsystem 64. In another embodiment, the pump 68 is an electrically powered fluid pump. Other types of fluid pumps could be utilized as part of the thermal management system 54 within the scope of this disclosure.

The T-joint 70 is arranged to divert a portion of the coolant C exiting from the radiator 66 to the air cooler loop 72. Coolant C that enters the air cooler loop 72 may be communicated through the water charge air cooler 74. The water charge air cooler 74 may be part of an engine system configured for delivering conditioned airflow F from a turbocharger 86 to the engine 14, which may be a boosted engine that is operably coupled of the turbocharger 86. The coolant C may accept thermal energy from the airflow F as it is blown across the water charge air cooler 74 in order to cool the airflow F. Stated another way, heat from the airflow F is rejected into the coolant C of the coolant subsystem 64 within the water charge air cooler 74.

The coolant C exiting the water charge air cooler 74 may be returned to the radiator 66. Thermal energy in the coolant C may subsequently be rejected to the atmosphere via the radiator 66.

The valve 76 is configured to control the flow of the coolant C into either the internal cooling circuit 60 of the battery pack 24 or the battery bypass loop 78. The valve 76 may be a multi-position solenoid valve. However, other types of valves are also contemplated within the scope of this disclosure.

The valve 76 may include a first outlet 88 that can be opened to deliver the coolant C to the inlet 84 of the battery pack 24 and a second outlet 90 that can be opened to deliver the coolant C into the battery bypass loop 78. In an embodiment, the default position of the valve 76 is for the first outlet 88 to be open to allow the coolant C to flow to the battery pack 24 and for the second outlet 90 to be closed to prevent the coolant C from entering the battery bypass loop 78. Coolant C that enters the battery bypass loop 78 bypasses the battery pack 24 and therefore does not directly thermally manage the battery cells of the battery pack 24. Instead, the coolant C from the battery pass loop 78 is delivered directly to the power electronics module 58.

The thermal management system 54 may additionally include a coolant temperature sensor 92 (i.e., a first sensor or grouping of sensors) and a battery cell temperature sensor 94 (i.e., a second sensor or groupings of sensors associated with the battery pack 24). The coolant temperature sensor 92 is adapted for sensing the temperature of the coolant C exiting the radiator 66. In an embodiment, the coolant temperature sensor 92 is positioned at or near the outlet 82 of radiator 66. However, other locations are also contemplated within the scope of this disclosure.

The battery cell temperature sensor 94 is configured to sense the temperature of one or more battery cells of the battery pack 24. The battery cell temperature sensor 94 may be part of a battery management system packaged inside the battery pack 24.

A control unit 96 may control operations of the thermal management system 54. The control unit 96 could be a stand-alone control unit associated with the thermal management system 54 or could be part of an overall vehicle control unit, such as a vehicle system controller (VSC) that includes a powertrain control unit, a transmission control unit, an engine control unit, a battery control module, etc. It should therefore be understood that the control unit 96 and one or more other controllers can collectively be referred to as a "control unit" that is configured to control, such as through a plurality of integrated algorithms, various actuators in response to signals from various sensors associated with the thermal management system 54. The various controllers that make up the VSC can communicate with one another using a common bus protocol (e.g., CAN), for example.

In an embodiment, the control unit 96 is programmed with executable instructions for interfacing with and operating the various components of the thermal management system 54 for thermally managing the battery pack 24 and/or the power electronics module 58. The control unit 96 may include various inputs and outputs for interfacing with the various components of the thermal management system 54, including but not limited to the battery pack 24, the power electronics module 58, the pump 68, the valve 76, the coolant temperature sensor 92, and the battery cell temperature sensor 94. The control unit 96 may further include a processor 98 and non-transitory memory 99 for executing the various control strategies and modes of the thermal management system 54.

The control unit 96 may receive feedback from each of the coolant temperature sensor 92 and the battery cell temperature sensor 94 for determining whether, via the valve 76, the coolant C should be redirected through the battery bypass loop 78 or not during various usage cases. As discussed in greater detail below, the decision to direct the coolant C through the battery bypass loop 78 may be based on an amount of heat rejection into the coolant C from the water charge air cooler 74. For example, in an embodiment, the control unit 96 may control the thermal management system 54 by selectively directing the coolant C through the battery bypass loop 78 when the coolant C is too hot as a result of picking up excessive heat from the water charge air cooler 74. In another embodiment, the control unit 96 may control the thermal management system 54 by selectively directing the coolant C through the battery bypass loop 78 in order to prevent the coolant C from preventing the battery pack 24 from warming up when the coolant C is too cold to warm the battery pack 24 because of a lack of heat rejection into the coolant C from the water charge air cooler 74. In yet another embodiment, the control unit 96 may control the thermal management system 54 by selectively directing the coolant C through the battery pack 24 to heat the battery pack 24 when the battery pack 24 is considered too cold, such as during cold ambient conditions, for example.

Figure 3:
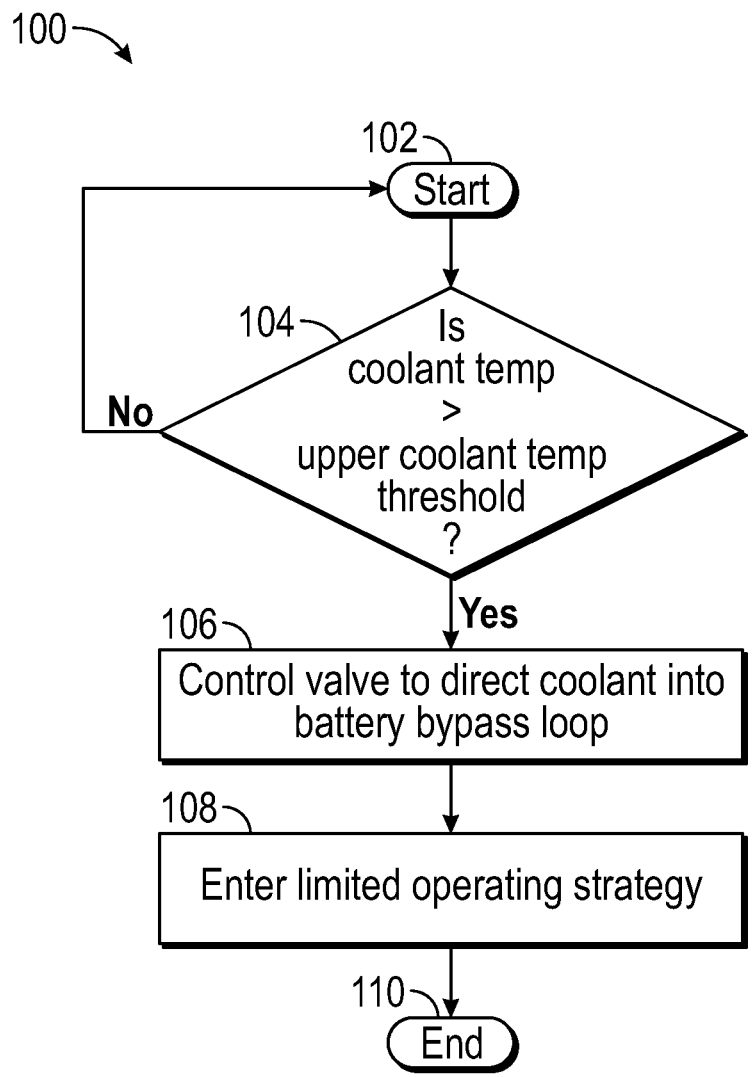
FIG. 3 schematically illustrates a method of controlling a battery thermal management system according to an embodiment of this disclosure.

FIG. 3, with continued reference to FIGS. 1-2, schematically illustrates an exemplary method 100 for controlling the thermal management system 54 of the electrified vehicle 12. For example, the method 100 may be a control strategy that is executed for determining whether a temperature of the coolant C is too hot for effectively maintaining the battery cells 56 of the battery pack 24 within an optimal working temperature range at any given point of time during vehicle operation. The coolant C may periodically become too hot by virtue of picking up excessive heat from the water charge air cooler 74, for example.

In an embodiment, the control unit 96 is programmed with one or more algorithms adapted to execute the exemplary method 100, or any other control strategy. In another non-limiting embodiment, the method 100 is stored as executable instructions (e.g., software code) in the memory 99 of the control unit 96.

The method 100 may begin at block 102. At block 104, the control unit 96 may determine whether the coolant temperature sensed by the coolant temperature sensor 92 is greater than an upper coolant temperature threshold. The upper coolant temperature threshold is a predefined temperature value or range of temperature values that may be stored in the memory 99 of the control unit 96. In an embodiment, the upper coolant temperature threshold is a temperature of about 60° C. In this disclosure, the term "about" means that the expressed quantities or ranges need not be exact but may be approximated and/or larger or smaller, reflecting acceptable tolerances, conversion factors, measurement error, etc.

When a YES flag is returned at block 104, the method 100 proceeds to block 106. At this step, the control unit 96 may control the valve 76 in order to redirect the coolant C into the battery bypass loop 78 and therefore bypass the battery pack 24. The over-heated coolant C is therefore prevented from creating a thermal gradient across the battery cells 56 of the battery pack 24, thereby avoiding degraded performance of the battery pack 24.

The heat rejection into the coolant C from the water charge air cooler 74 can be relatively significant during some engine operating conditions. Redirecting the coolant C through the battery bypass loop 78 during these high heat rejection situations can help mitigate the potential for the heat rejection raising the battery cell 56 temperatures to levels that could negatively impact the performance and/or life of the battery cells 56.

The method 100 may optionally proceed to block 108 from block 106. At this step, the control unit 96 may command that the electrified vehicle 12 enter a limited operating strategy. As part of such a strategy, various auxiliary features (e.g., auxiliary power DC-AC inverter, emission control features, hybrid regeneration features, etc.) of the electrified vehicle 12 can be temporarily disabled in order to maintain primary operating functions of the vehicle. The limited operating strategy functions to support 12V vehicle loads while preventing further loads on the battery pack 24 that could degrade battery performance due to the elevated temperatures. The method 100 may then end at block 110.

Figure 4:
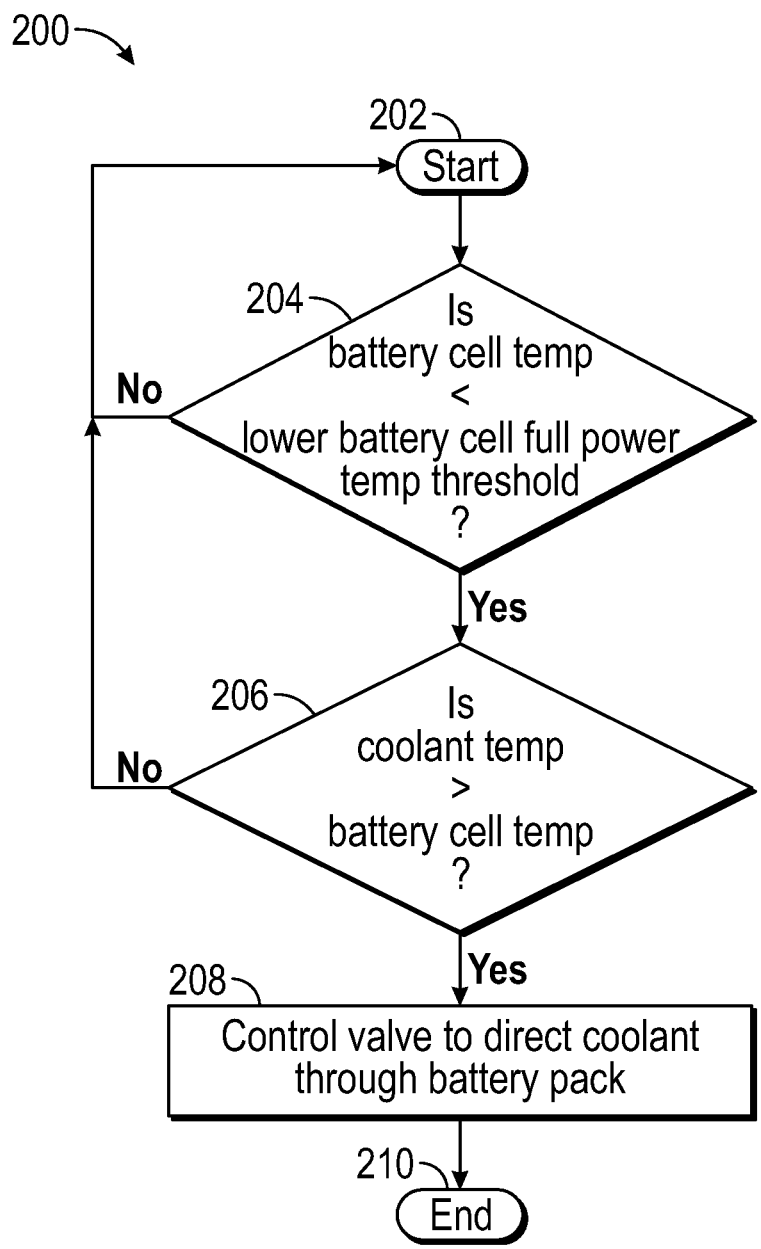
FIG. 4 schematically illustrates a method of controlling a battery thermal management system according to another embodiment of this disclosure.

FIG. 4, with continued reference to FIGS. 1-2, schematically illustrates another exemplary method 200 for controlling the thermal management system 54 of the electrified vehicle 12. The method 200 may be a control strategy that can be executed for determining when it is appropriate to leverage the heat picked up from the water charge air cooler 74 for warming the battery pack 24 with the coolant C at any given point of time during vehicle operation.

The method 200 may begin at block 202. At block 204, the control unit 96 may determine whether the battery cell temperature sensed by the battery cell temperature sensor 94 is less than a lower battery cell full power temperature threshold. The lower battery cell full power temperature threshold is a predefined temperature value or range of temperature values that may be stored in the memory 99 of the control unit 96. In an embodiment, the lower battery cell full power temperature threshold is a temperature of about 20° C.

When a YES flag is returned at block 204, the method 200 may proceed to block 206, at which time the control unit 96 may determine whether the coolant temperature sensed by the coolant temperature sensor 92 is greater than the battery cell temperature sensed by the battery cell temperature sensor 94. If YES, the control unit 96 may control the valve 76 in order to direct the coolant C through the internal cooling circuit 60 of the battery pack 24 at block 208. The coolant C is therefore permitted to warm the battery cells 56 during this thermal management cycle of the thermal management system 54. The method 200 thus enables the thermal management system 54 to take advantage of the heat rejection of the water charge air cooler 74 into the coolant C for warming the battery pack 24 when certain conditions exist, thereby improving battery performance earlier in the drive cycle and mitigating battery chemistry limitations during cold ambient conditions. The method 200 may then end at block 210.

Figure 5:
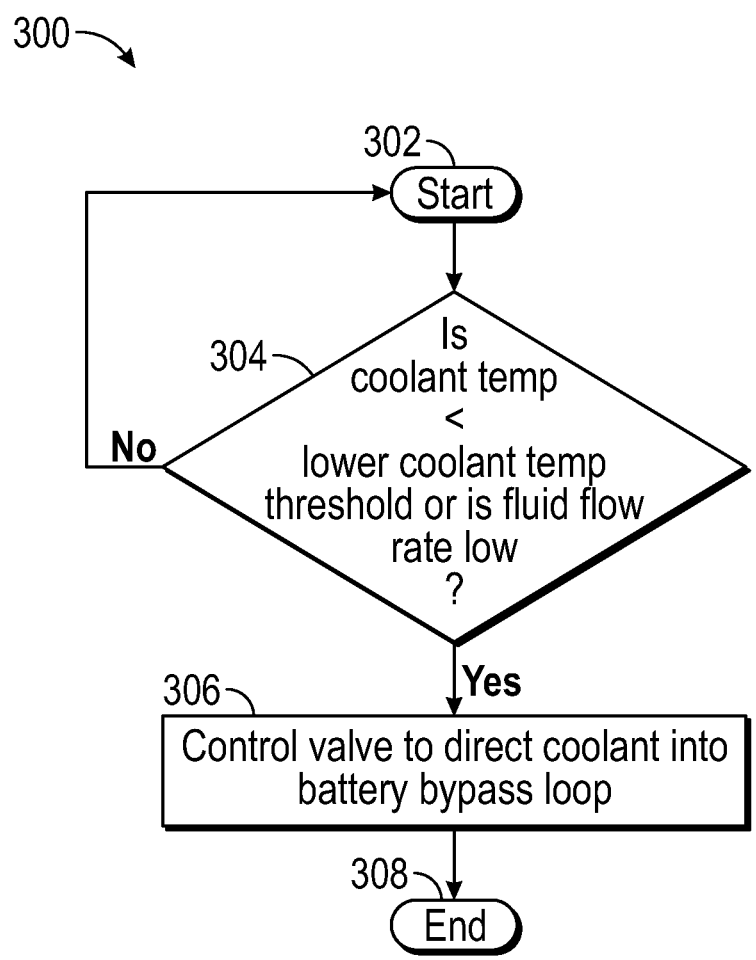
FIG. 5 schematically illustrates a method of controlling a battery thermal management system according to yet another embodiment of this disclosure.

FIG. 5, with continued reference to FIGS. 1-2, schematically illustrates yet another exemplary method 300 for controlling the thermal management system 54 of the electrified vehicle 12. The method 300 is a control strategy that may be executed for maintaining the battery cells 56 of the battery pack 24 within an optimal working temperature range when a temperature of the coolant C is too cold at any given point of time during vehicle operation. The coolant C may periodically become too cold due to relatively low heat rejection from the water charge air cooler 74 and/or relatively low coolant flow for prolonged periods of time, for example.

The method 300 may begin at block 302. At block 304, the control unit 96 may determine whether the coolant temperature sensed by the coolant temperature sensor 92 is less than a lower coolant temperature threshold. The lower coolant temperature threshold is a predefined temperature value or range of temperature values that may be stored in the memory 99 of the control unit 96. In an embodiment, the lower coolant temperature threshold is a temperature of about −10° C. Alternatively or additionally as part of block 304, the control unit 96 may communicate with the pump 68 for determining whether the flow rate of the coolant C has been low for a prolonged period of time. Low temperatures and/or low flow rates of the coolant C may be caused by low heat rejection into the coolant C from the water charge air cooler 74, a high volume of cold ambient air through the radiator 66, etc.

When a YES flag is returned at block 304, the method 300 proceeds to block 306. Here, the control unit 96 may control the valve 76 in order to redirect the coolant C into the battery bypass loop 78 and therefore bypass the battery pack 24. The coolant C is therefore prevented from further cooling the battery pack 24. Stated another way, the coolant C is prevented from preventing the battery pack 24 from warming up or maintaining its optimal operating temperature by bypassing the battery pack 24. The method 300 may then end at block 308.

The exemplary thermal management systems of this disclosure utilize a combination of a battery bypass loop and heat rejection from a water charge air cooler for enabling proper battery operating temperatures during all ambient conditions and vehicle operating conditions. The proposed systems and methods avoid the costs associated with known chiller systems for mitigating coolant temperature fluctuations.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A thermal management system, comprising:
   a traction battery pack;
   a coolant subsystem configured to circulate a coolant through the traction battery pack,
   wherein the coolant subsystem includes an air cooler loop and a battery bypass loop;
   a water charge air cooler positioned within the air cooler loop;
   a valve arranged to control a flow of the coolant to either the traction battery pack or the battery bypass loop; and
   a control unit configured to control a position of the valve based on an amount of heat rejection into the coolant from the water charge air cooler,
   wherein the coolant subsystem includes a T-joint configured to divide the coolant between a first portion that is directed to the water charge air cooler and a second portion that is directed to the valve.

2. The system as recited in claim 1, wherein the traction battery pack includes an internal cooling circuit configured to receive the coolant from the valve.

3. The system as recited in claim 1, wherein the coolant subsystem is configured to circulate the coolant through a power electronics module from either the traction battery pack or the battery bypass loop.

4. The system as recited in claim 1, wherein the coolant subsystem includes a radiator and a pump.

5. The system as recited in claim 1, comprising a first sensor for monitoring a temperature of the coolant and a second sensor for monitoring a temperature of a battery cell of the traction battery pack, wherein the control unit is configured to control the position of the valve based on feedback from the first sensor, the second sensor, or both.

6. The system as recited in claim 1, wherein the water charge air cooler is part of an engine system that includes a turbocharger and an internal combustion engine.

7. The system as recited in claim 1, wherein the control unit is configured to position the valve for directing the coolant through the battery bypass loop when a temperature of the coolant is greater than an upper coolant temperature threshold.

8. The system as recited in claim 1, wherein the control unit is configured to position the valve for directing the coolant through the battery bypass loop when a temperature of the coolant is less than a lower coolant temperature threshold.

9. The system as recited in claim 1, wherein the control unit is configured to position the valve for directing the coolant through the traction battery pack when a battery cell temperature of the traction battery pack is less than a lower battery cell full power temperature threshold.

10. The system as recited in claim 1, wherein the water charge air cooler is fluidly connected to a radiator within the coolant subsystem.

11. A method, comprising:
    allowing or preventing a flow of a coolant to a traction battery pack within an electrified vehicle thermal management system based on an amount of heat rejection from a water charge air cooler into the coolant,
    wherein a valve is arranged to control the flow of the coolant to either the traction battery pack or a battery bypass loop,
    wherein a T-joint is configured to divide the coolant between a first portion that is directed to the water charge air cooler and a second portion that is directed to the valve.

12. The method as recited in claim 11, wherein the coolant is communicated to the traction battery pack when a battery cell temperature of the traction battery pack is less than a lower battery cell full power temperature threshold.

13. The method as recited in claim 11, wherein the coolant is communicated to the battery bypass loop instead of the traction battery pack when a temperature of the coolant is greater than an upper coolant temperature threshold.

14. The method as recited in claim 11, wherein the coolant is communicated to the battery bypass loop instead of the traction battery pack when a temperature of the coolant is less than a lower coolant temperature threshold.

15. The method as recited in claim 11, comprising communicating the coolant through the battery bypass loop and then to a power electronics module when the flow of the coolant is prevented to the traction battery pack.

16. The method as recited in claim 11, wherein the water charge air cooler is fluidly connected to a radiator within a coolant subsystem of the electrified vehicle thermal management system.

17. The method as recited in claim 11, comprising monitoring a temperature of the coolant with a first sensor, and monitoring a temperature of a battery cell of the traction battery pack with a second sensor.

18. The method as recited in claim 11, comprising entering a limited operating strategy of the electrified vehicle when the coolant is prevented from flowing to the traction battery pack.

19. A thermal management system, comprising:
a traction battery pack;
a power electronics module;
a coolant subsystem configured to circulate a coolant through the traction battery pack and the power electronics module,
wherein the coolant subsystem includes an air cooler loop and a battery bypass loop;
a water charge air cooler positioned within the air cooler loop,
wherein the water charge air cooler is part of an engine system that includes a turbocharger and an internal combustion engine,
wherein the coolant exchanges heat with an airflow from the turbocharger within the water charge air cooler;
a valve arranged to control a flow of the coolant to either the traction battery pack or the battery bypass loop; and
a control unit programmed with instructions for controlling a position of the valve based on an amount of heat rejection from the airflow to the coolant while the coolant is passed through the water charge air cooler,
wherein the valve is positioned immediately upstream of an inlet of the traction battery pack, and an outlet of the battery bypass loop is positioned immediately upstream of an inlet of the power electronics module.

* * * * *